(12) United States Patent
Amtmann et al.

(10) Patent No.: US 7,032,826 B2
(45) Date of Patent: *Apr. 25, 2006

(54) DATA CARRIER HAVING A COMMUNICATION RESONANT CIRCUIT AND HAVING MEANS FOR CHANGING THE RESONANT FREQUENCY OF THIS RESONANT CIRCUIT IN EITHER SENSE

(75) Inventors: Franz Amtmann, Graz (AT); Thomas Burger, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 112 days.

This patent is subject to a terminal disclaimer.

(21) Appl. No.: 10/783,623

(22) Filed: Feb. 20, 2004

(65) Prior Publication Data

US 2004/0159711 A1    Aug. 19, 2004

Related U.S. Application Data

(63) Continuation of application No. 09/847,217, filed on May 2, 2001, now Pat. No. 6,708,891.

(30) Foreign Application Priority Data

May 5, 2000   (EP) ................................. 00890144

(51) Int. Cl.
G06K 19/06   (2006.01)
G06K 7/00    (2006.01)

(52) U.S. Cl. ....................................... 235/492; 235/439
(58) Field of Classification Search ................ 235/441, 235/451, 492, 383, 385, 439
See application file for complete search history.

(56) References Cited

U.S. PATENT DOCUMENTS

| 5,874,725 | A * | 2/1999 | Yamaguchi | 235/492 |
| 6,424,029 | B1 * | 7/2002 | Giesler | 257/679 |
| 6,547,149 | B1 * | 4/2003 | Wuidart et al. | 235/492 |
| 6,585,165 | B1 * | 7/2003 | Kuroda et al. | 235/492 |
| 6,666,380 | B1 * | 12/2003 | Suzuya | 235/492 |
| 6,708,891 | B1 * | 3/2004 | Amtmann et al. | 235/492 |

* cited by examiner

Primary Examiner—Thien M. Le
Assistant Examiner—April Taylor
(74) Attorney, Agent, or Firm—Adam L. Stroud

(57) ABSTRACT

A data carrier for contactless communication with a communication station has a substrate and a communication resonant circuit connected to the substrate and consisting of a communication coil and of a capacitor configuration and having a resonant frequency which should have a nominal value, whereby enabling resonant frequency to be changed from an initial value both to higher frequency values and to lower frequency values.

6 Claims, 1 Drawing Sheet

DATA CARRIER HAVING A COMMUNICATION RESONANT CIRCUIT AND HAVING MEANS FOR CHANGING THE RESONANT FREQUENCY OF THIS RESONANT CIRCUIT IN EITHER SENSE

This application is a Continuation of Application Ser. No. 09/847,217, filed May 2, 2001, which issued as U.S. Pat. No. 6,708,891.

The invention relates to a data carrier which is adapted to provide contactless communication with a communication station and which has a substrate means and which has a communication resonant circuit connected to the substrate means and consisting of at least one communication coil and of a capacitor configuration which is connected to the at least one communication coil in an electrically conductive manner, which communication resonant circuit has a resonant frequency which should have a nominal value, and which has changing means for changing the resonant frequency of the communication resonant circuit, which changing means are adapted to change the resonant frequency from an initial value to higher frequency values.

Such a data carrier of the type defined in the opening paragraph is commercially available, as is known to the applicant, and is consequently known. In the known data carrier the substrate means is formed by a plastic foil and the capacitor configuration includes a changing means in the form of a tuning capacitor which is formed with the aid of a comb-shaped electrode and a strip-shaped electrode, the strip-shaped electrode being disposed perpendicularly to the comb teeth of the comb-shaped electrode and the tuning capacitor having at least one cut-out which extends through at least one comb tooth of the comb-shaped electrode and the strip-shaped electrode as well as the plastic foil. Owing to the provision of a cut-out in the known data carrier the value of the tuning capacitor can only be reduced and, consequently, the value of the resonant frequency of the communication resonant circuit can only be increased. This is the reason why in the series production of the known data carrier the resonant frequency of all the data carriers produced is initially made too low as compared with the desired nominal value, which is achieved by forming tuning capacitors whose value is too large in relation to a nominal value, a reduction of the value of the tuning capacitor and, consequently, an increase of the value of the resonant frequency of the communication resonant circuit being achieved by a trimming operation after production, in the present case by a punching operation. As a result of this, all the known data carriers thus produced, without exception, should be subjected to such a trimming operation, i.e. to a punching operation, which involves a substantial expense and leads to a considerable increase in production cost.

It is an object of the invention to preclude the aforementioned problems and to provide a data carrier which can be manufactured advantageously at substantially lower cost in the case mass production.

According to the invention, in order to achieve the aforementioned object with a data carrier of the type defined in the opening paragraph, the changing means are, in addition, adapted to change the resonant frequency from the initial value to lower frequency values.

With a data carrier in accordance with the invention it is achieved in a simple manner that a change of the value of the resonant frequency of the communication resonant circuit is possible not only in the sense of an increase but also in the sense of a decrease. This has the advantage that during the mass production of a data carrier in accordance with the invention the resonant frequency values need not be kept low intentionally in order to enable it to be subsequently increased during a trimming operation in order to trim a tuning capacitor, but that during mass production it is attempted to obtain a resonant frequency whose value is within given tolerance limits for as many as possible data carriers in accordance with the invention thus manufactured, without an additional adjustment operation being required. An advantageous consequence of this is that during the mass production of a data carrier in accordance with the invention no adjustment operation of any kind, i.e. no alignment operation, for example a trimming operation, is required for all those data carriers whose resonant frequency values lie within given tolerance limits and essentially correspond to a predetermined nominal value, which in practice is actually so for approximately 90% of the manufactured data carriers, as a result of which an adjustment or trimming operation is required for only a comparatively small number of data carriers, which is advantageous both in view of a minimal production time and in view of minimal production cost.

It has proved to be very advantageous when a data carrier in accordance with the invention in addition has the characteristic features as defined in claim 2. This results in a very simple construction.

It has proved to be particularly advantageous when a data carrier as described in the preceding paragraph in addition has the characteristic features as defined in claim 3 and claim 4. These constructions have proved to be particularly advantageous in numerous tests carried out in the course of the development of a data carrier in accordance with the invention.

The above-mentioned as well as further aspects of the invention will become apparent from the embodiment described hereinafter by way of example and will be elucidated with reference to this example.

The invention will now be described in more detail with reference to the drawings, which show an embodiment given by way of example but to which the invention is not limited.

Figure 1:
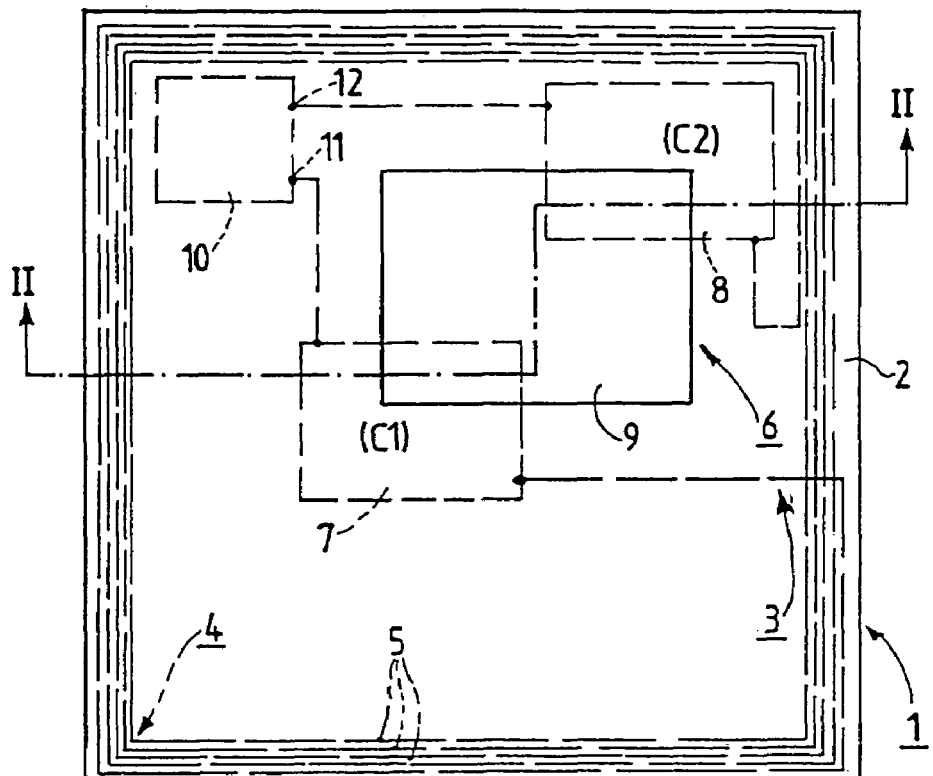
FIG. 1 is a diagrammatic plan view of a data carrier in accordance with an embodiment of the invention.

FIG. 1 shows a data carrier 1. The data carrier 1 is referred to as a label or tag. The data carrier 1 is adapted to provide contactless communication with a communication station, not shown in the Figures, by means of which a write operation or a read operation can be performed in order to read data stored in the data carrier 1 or write data into the data carrier 1 in a contactless manner.

Figure 3:
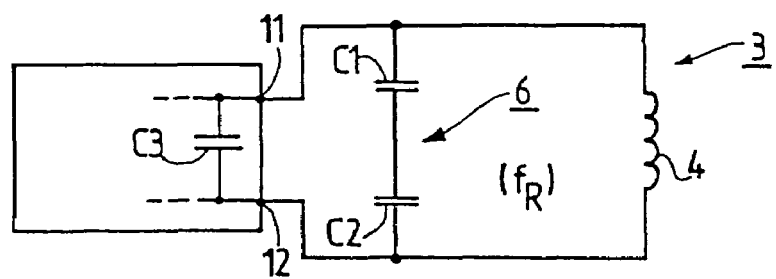
FIG. 3 is the circuit diagram of the circuit of the data carrier shown in FIG. 1.

The data carrier 1 has a substrate means 2, which is a thin plastic sheet manufactured in a lamination process but which may alternatively be manufactured in a different manner, for example in a molding process. For the clarity of the drawing the thickness of the substrate means 2 has been exaggerated in FIG. 3.

A communication resonant circuit 3 is attached to the substrate means 2. The communication resonant circuit 3 in the first place comprises a communication coil 4, which is embedded in the substrate means 2 and in the present case has five coil turns 5, and in the second place comprises a capacitor configuration 6 connected to the communication coil 4 in an electrically conductive manner. The capacitor configuration 6 comprises two juxtaposed metal electrode plates 7 and 8 attached to the substrate means 2, i.e. embedded in the substrate means 2 like the communication coil 4. In addition, a trimming plate 9 has been provided, which forms a part of the capacitor configuration 6 and which faces the two electrode plates 7 and 8 and is electrically insulated with respect to the electrode plates 7 and 8, namely by means of the plastic substrate means 2.

Figure 2:
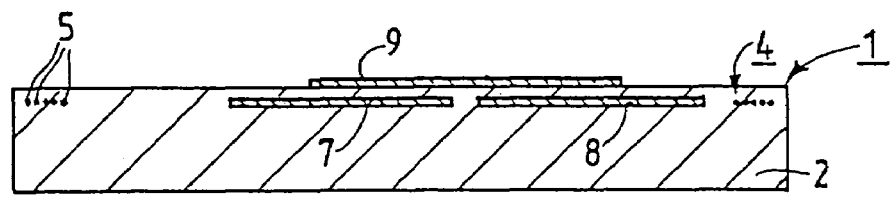
FIG. 2 shows a part of the data carrier of FIG. 1 in a sectional view taken on the line II—II in FIG. 1.

The communication coil 4 has a planar shape and the coil turns 5 are consequently coplanar, as is shown in FIG. 2. In the present case, the electrode plates 7 and 8 are basically also disposed in the same plane as the coil turns. In a plan view of the data carrier 1 the electrode plates 7 and 8 and the trimming plate 9 are disposed inside the coil turns 5 of the communication coil 4.

A first capacitor C1 (see FIG. 3) of the capacitor configuration 6 is formed with the aid of the first electrode plate 7 and the trimming plate 9. A second capacitor C2 (see FIG. 3) of the capacitor configuration is formed with the aid of the second electrode plate 8 and the trimming plate 9.

The data carrier 1 further includes an integrated device (IC) 10 embedded in the substrate means 2 and having two terminals 11 and 12, of which the first terminal 11 is connected to the first electrode plate 7 and the second terminal 12 to the second electrode plate 8 in an electrically conductive manner. A main capacitor C3 of the capacitor configuration 6 is formed with the aid of the integrated device 10 and is situated between the two terminals 11 and 12. However, such a main capacitor 3 may alternatively take the form of a separate capacitor which is external to the integrated device 10.

The communication resonant circuit 3, which consists of the communication coil 4 and of the capacitor configuration 6, has a resonant frequency $f_R$, which should have a nominal value, which for the present data carrier 1 should correspond to the communication operating frequency between the data carrier 1 and the communication station, not shown. In the production of the data carrier 1 it is attempted to achieve that the finished data carrier 1 has a resonant frequency $f_R$ within a tolerance range defined with respect to the desired nominal value. Experience shows that in the series production of data carriers 1 it is achieved that for approximately 90% of these data carriers 1 the resonant frequency $f_R$ lies within the tolerance range defined with respect to the desired nominal value.

In such mass production the desired resonant frequency $f_R$ will be outside the specified tolerance range for approximately 10% of the manufactured data carriers 1. For these data carriers 1 it is therefore advantageous if the resonant frequency $f_R$ is variable. In order to guarantee this, the data carrier 1 has changing means 9 for changing the resonant frequency of the communication resonant circuit 3. In the present case, these changing means 9 are formed by the metal trimming plate 9, which trimming plate 9 is mechanically connected to the substrate means 2 of the data carrier 1 in a position that determines the resonant frequency of the communication resonant circuit 3.

In the normal case the trimming plate 9 is not connected to the substrate means 2 of the data carrier 1 during the mass production of the data carrier 1, i.e. when the resonant frequency $f_R$, which is determined by the main capacitor C3 and the communication coil 4, is within the specified tolerance range with respect to a predetermined nominal value, which can simply be determined with the aid of a test and measurement device during the mass production. In this case, the capacitor configuration 6 is formed by the main capacitor C3 only.

When during the mass production it is found with the aid of the test and measurement device that the actual resonant frequency $f_R$ defined by the main capacitor C3 and the communication coil 4 lies outside the specified tolerance range, the actual value of the resonant frequency $f_R$ is determined by means of the test and measurement device. Subsequently, the deviation of the actual resonant frequency $f_R$ from the desired nominal value is determined and with the aid of a computing device a position for the trimming plate 9 on the substrate means 2 calculated from this deviation, in which position the trimming plate 9 first of all influences the inductance value of the communication coil 4 in such a manner and secondly produces such values for the two capacitances C1 and C2 that a resonant frequency $f_R$ is obtained within the specified tolerance range. FIG. 1 shows such a position of the trimming plate 9.

The main advantage of the data carrier in accordance with as shown in FIG. 1 is that the trimming plate 9 enables the value of the resonant frequency $f_R$ of the communication resonant circuit 3 to be changed not only so as to increase the resonant frequency $f_R$ but also so as to decrease the resonant frequency $f_R$.

Referring to FIG. 1, it is to be noted with regard to the change of the resonant frequency $f_R$ that in the case that the trimming plate 9 is connected to the substrate means 2 at a location exactly in the center of the data carrier 1 the trimming plate 9 has only a comparatively small influence on the inductance value of the communication coil 4. The influence on the inductance value of the communication coil 4 increases as the trimming plate is connected to the substrate means 2 at a location closer to the communication coil 4. When the trimming plate 9 is connected to the substrate means 2 at a location in which the trimming plate 9 has no overlap at all with one of the two electrode plates 7 or 8, this results in one of the two capacitances C1 or C2 being no longer existent, as a result of which the other one of these two capacitances C1 and C2 no longer being active owing to the absence of an electrical connection, which means that the trimming plate 9 influences only the inductance value of the communication coil 4.

It is to be noted that the geometrical shape of the electrode plates 7 and 8 and of the trimming plate 9 as shown in FIG. 1 is merely one of a multitude of variants. All the three plates may differ both as regards their shapes and their superficial dimensions.

The invention claimed is:

1. A data carrier for providing contactless communication with a communication station, comprising a substrate means and a communication resonant circuit provided at the substrate means, said communication resonant circuit consisting of at least one communication coil and of a capacitor configuration connected to the at least one communication coil in an electrically conductive manner, said communication resonant circuit having a resonant frequency and being provided for cooperation with changing means for changing the resonant frequency, wherein said changing means are adapted to increase said resonant frequency from an initial value to a desired value it said initial value is lower than said desired value, as well as to decrease said resonant frequency from said initial value to said desired value if said initial value is higher than said desired value.

2. A data carrier as claimed in claim 1, characterized in that the capacitor configuration has two juxtaposed electrode plates made of metal and being provided for cooperation with the changing means.

3. A data carrier as claimed in claim 2, characterized in that the changing means are formed by a single trimming plate made of a metal, said trimming plate when positioned on the substrate means forms a part of the capacitor configuration and is positioned to face the two electrode plates and is electrically insulated with respect to the electrode plates.

4. A data carrier as claimed in claim 3, characterized in that the trimming plate is mechanically connected to the substrate means of the data carrier at a location which determines the resonant frequency of the communication resonant circuit.

5. A data carrier as claimed in claim 3, characterized in that the communication coil has an essentially planar shape and has essentially coplanar coil turns, and the electrode plates and the trimming plate are disposed inside the coil turns of the communication coil.

6. A data carrier as claimed in claim 1, characterized in that said desired value is a nominal value of said resonant frequency.

* * * * *